(12) United States Patent
Husemann et al.

(10) Patent No.: US 6,723,786 B2
(45) Date of Patent: Apr. 20, 2004

(54) PRESSURE SENSITIVE ADHESIVE, PARTICULARLY FOR APOLAR SURFACES

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/123,625

(22) Filed: Apr. 16, 2002

(65) Prior Publication Data

US 2003/0073767 A1 Apr. 17, 2003

(30) Foreign Application Priority Data

Jun. 20, 2001 (DE) .......................................... 101 29 612

(51) Int. Cl.[7] ............................................. C08F 287/00
(52) U.S. Cl. ........................ 524/560; 524/563; 524/570; 526/318.4; 526/320; 526/326; 525/94; 156/275.5
(58) Field of Search ................................ 524/560, 563, 524/570; 526/318.4, 320, 326; 525/94; 156/275.5

(56) References Cited

U.S. PATENT DOCUMENTS

| | | | | |
|---|---|---|---|---|
| 6,432,475 B1 | * | 8/2002 | Yamamoto et al. | ....... 427/208.4 |
| 6,440,519 B1 | * | 8/2002 | Takase et al. | .............. 428/65.2 |

FOREIGN PATENT DOCUMENTS

| | | | | |
|---|---|---|---|---|
| DE | 100 08 842 C1 | 2/2000 | .............. | C08J/3/24 |
| EP | 0 651 013 B1 | 5/1995 | ........... | C08L/51/00 |
| EP | 0 822 967 B1 | 2/1998 | .......... | C09J/151/06 |
| EP | 0 921 170 A1 | 6/1999 | ........... | C09J/153/00 |
| WO | WO 95/02003 | 1/1995 | ......... | C08F/290/04 |

OTHER PUBLICATIONS

Specification—U.S. Ser. No. 09/769,209, filed Jan. 25, 2001 (English language counterpart to DE 100 08 842 C10).
English language Abstract for EP 0 921 170.

* cited by examiner

*Primary Examiner*—David W. Wu
*Assistant Examiner*—Satya Sastri
(74) *Attorney, Agent, or Firm*—Norris McLaughlin & Marcus

(57) ABSTRACT

A pressure sensitive adhesive based on block copolymers, said block copolymers having at least one unit composed of three successive polymer blocks comprising alternating polymer blocks P(A) and P(B), wherein P(A) has a softening temperature of from −80° C. to 0° C., and is comprised of at least one acrylic or methacrylic acid derivative of the general formula $$CH_2=CH(R')(COOR'') \qquad (I)$$

and at least one acrylated monomer of the general formula $$CH_2=CH(R''')(COOR^{IV}) \qquad (II), and$$

P(B) represents a homopolymer or copolymer block having a softening temperature of from 20° C. to 175° C., and the polymer blocks P(A) and P(B) are not homogeneously miscible with each other.

17 Claims, No Drawings

PRESSURE SENSITIVE ADHESIVE, PARTICULARLY FOR APOLAR SURFACES

The invention relates to pressure sensitive adhesives based on block copolymers, said block copolymers comprising at least the unit P(A)-P(B)-P(A), composed of a middle polymer block P(B) and of two polymer blocks P(A) surrounding the middle polymer block P(B), or the unit P(B)-P(A)-P(B), composed of a middle polymer block P(A) and of two polymer blocks P(B) surrounding the middle polymer block P(A), to the use of such adhesives, and to a process for preparing them.

BACKGROUND OF THE INVENTION

In industry, hotmelt processes operating with solventless coating technology are of growing importance in the preparation of pressure sensitive adhesives. In general, environmental regulations and increasing costs are forcing forward the development process of such adhesives. Besides SIS (styrene-isoprene-styrene copolymers) systems, acrylic polymers are increasingly being applied from the melt as a polymer film to backing materials. Moreover, for specialty applications, pressure sensitive adhesive tapes which feature very low outgassing are needed. This is something which can be ensured only by means of hotmelt processes, since conventional coatings applied from solution always still contain small fractions of residual solvent.

As a result of the changeover to hotmelt processes, some of the crosslinking mechanisms employed to date are becoming redundant. For example, thermal crosslinking processes using metal chelates or polyfunctional isocyanates, which are very popular with the solvent-based systems, can no longer be employed. As a result, the crosslinking of polyacrylate pressure sensitive adhesives by irradiation with ultraviolet light (UV) or with electron beams (EB), the latter being known as electron beam curing (EBC), is being strongly promoted at the present time.

Furthermore, there is an increasing demand for repositionable pressure sensitive adhesive tapes. These tapes show no peel increase on a variety of substrates; that is, even after being bonded for several days or weeks, there is no change in the bond strength and the tapes can be removed from the substrate without residue.

In order, then, to lower the bond strengths to polar substrates, such as steel, for example, and to ensure repositionability, it is very common to add apolar resins. An unwanted side effect of this method is often the migration of the resins within the pressure sensitive adhesive.

More recent methods use microparticles in the pressure sensitive adhesives. In this case, heat-expandable microparticles [U.S. Pat. No. 5,441,810 A] are used which following temperature exposure expand and permit easier removal from the substrate. The temperature increase required before the adhesive is removed is a disadvantage.

Further examples of the use of microspherical particles are given in U.S. Pat. No. 5,746,625 A. Here again, repositionable pressure sensitive adhesives and corresponding tapes with the addition of these additives are produced.

U.S. Pat. Nos. 4,166,152 A, 4,495,318 A, and 4,598,112 A likewise describe tacky particles which can be "reused" as adhesives.

A disadvantage common to all adhesives containing microspherical particles is that they cannot be used as hotmelt pressure sensitive adhesives. Since in the hotmelt process high shear forces are exerted by the extrusion procedure on the adhesive and on the particles, with the consequence that the particles are destroyed in the course of processing.

EP 0 707 604 A1 uses polyethylene/butylene macromonomers for copolymerization with acrylates. As a result, phases are formed which have a low glass transition temperature, which in turn allow the adhesives to flow on apolar surfaces, and which therefore ensure high bond strengths to PE and PP.

Additionally, these adhesives, owing to their low polarity, are said to possess a low peel increase at least on polar substrates. A disadvantage is the poor conversion of the polymerization process described. Moreover, these pressure sensitive adhesives require crosslinking, since otherwise the cohesion of the pressure sensitive adhesive tapes becomes too low. Moreover, it is very difficult to process these polyacrylates as hotmelts, since the high residual monomer fractions impact negatively on the concentration process, and migration in the adhesive tape can adversely affect the long-term technological properties.

U.S. Pat. Nos. 5,614,586 A and 5,674,275 A describe tacky hydrogels which can be prepared from ethoxylated comonomers. The materials produced are repositionable, but are not pressure sensitive adhesives.

U.S. Pat. No. 5,314,962 A describes A-B-A block copolymers as elastomers for adhesives, which possess A domain formation as their cohesion-forming feature. As a result of the selection of the comonomers used, however, desired repositionable pressure sensitive adhesives cannot be produced.

EP 0 921 170 A1 describes A-B-A block copolymers which have been modified with additions of resin. Here again, owing to the selection of the comonomers and added resins, pressure sensitive adhesives with good repositionability cannot be achieved.

EP 0 408 429 A1 and EP 0 408 420 A1 describe A-B-A block copolymers which, however, were synthesized by living anionic polymerization. Because of the absence of an acrylic acid fraction, however, these polymers are unsuited to use as pressure sensitive adhesives, since the internal cohesion of the middle block is too low. Additionally, because of the anionic polymerization, it is not possible to use readily deprotonated comonomers such as hydroxyl-functionalized or ethoxy-functionalized acrylates or methacrylates, for example.

In U.S. Pat. No. 6,069,205 A, diblock and triblock copolymers are prepared by an atom transfer polymerization and utilized for adhesives. This method is also unsuitable for preparing pressure sensitive adhesives, since it uses relatively high catalytic amounts of heavy metal compounds which would have to be removed, in a cumbersome operation, by extraction processes.

EP 1 008 640 A1 describes styrene block copolymers comprising an acrylate middle block composed, however, of the common $C_2$ to $C_{14}$ alkylacrylates. Because of the restriction of the comonomers this method can also not be used to produce repositionable pressure sensitive adhesives. Moreover, metal salts are used to prepare these polymers too (in analogy to U.S. Pat. No. 6,069,205 A), which would have to be removed, again a cumbersome operation, for pressure sensitive adhesive tape applications.

It is an object of the invention to provide improved pressure sensitive adhesives which do not have the disadvantages of the prior art, or only to a reduced extent, and which, therefore, can be coated even in the uncrosslinked state, possess consistent bond strength to a variety of substrates, can be processed as hotmelt adhesives, and exhibit good cohesion.

SUMMARY OF THE INVENTION

The invention accordingly provides a pressure sensitive adhesive based on block copolymers, said block copolymers having at least one unit composed of three successive polymer blocks, said three successive polymer blocks being chosen in alternation from the group of the polymer blocks P(A) and P(B), wherein P(A) represents a homopolymer or copolymer block obtainable from a component A which is composed of at least two monomers A1, A2, the polymer block P(A) having a softening temperature of from −80° C. to 0° C., at least one (A1) of the monomers of component A is an acrylic or methacrylic acid derivative of the general formula $$CH_2=CH(R^I)(COOR^{II}) \qquad (I)$$

in which $R^I$=H or $CH_3$ and $R^{II}$ is an aliphatic linear, branched or cyclic, substituted or unsubstituted, saturated or unsaturated alkyl radical having from 1 to 20 carbon atoms, at least one further (A2) of the monomers of component A is an acrylated monomer of the general formula $$CH_2=CH(R^{III})(COOR^{IV}) \qquad (II)$$

in which $R^{III}$=H or $CH_3$ and $R^{IV}$ is an oligomeric or polymeric glycol with at least two glycol units, P(B) represents a homopolymer or copolymer block obtainable from a component B which is composed of at least one monomer B1, the polymer block P(B) having a softening temperature of from 20° C. to 175° C., and the polymer blocks P(A) are not homogeneously miscible with the polymer blocks P(B).

Accordingly, the block copolymers of the inventive pressure sensitive adhesive comprise at least the unit P(B)-P(A)-P(B) composed of a middle polymer block P(A) and of two polymer blocks P(B) enclosing the middle polymer block P(A), and/or the structural unit which is inverse to this, i.e., at least the unit P(A)-P(B)-P(A) composed of a middle polymer block P(B) and of two polymer blocks P(A) enclosing the middle polymer block P(B), subject to the above-described proviso for the polymer blocks P(A) and P(B).

The block copolymers for the pressure sensitive adhesive of the invention can be prepared and used to advantage in a very wide variety of structures. Explicitly, reference may be made to linear or branched chains of the polymer blocks P(A) and P(B), corresponding for example to a general structure $[P(A)-P(B)]_n$, to star polymers of P(A) and P(B), corresponding for example to the general structures $[[P(A)-P(B)]_n]_mX$ or $[[P(B)-P(A)]_n]_mX$ or $[[P(A)-P(B)]_n]_mX[P(A)-P(B)]_p]_q$, or to the general structures $[[P(A)-P(B)]_n]_mXL_p$ or $[[P(B)-P(A)]_n]_mXL_p$, in which L here can denote different radicals. The enumeration of these structures is intended only by way of example, without representing any limitation. The structures also embrace all of the "asymmetric" structures in which all of the polymer blocks P(A) and P(B) meet per se the definitions mentioned above, but in which the indices n, m, p and q imply only the multiple occurrence of the individual units but not their chemical or structural identity. L can with preference be radicals which, for example, represent poly(meth)acrylates but which do not inherently have a block structure. Also included here are homopolymers of the components A or B.

In one further development of the inventive pressure sensitive adhesive, at least one vinyl compound containing functional groups is used as a further monomer A3 for component A.

It is particularly advantageous if component A for synthesizing the polymer blocks P(A) has the following composition:

from 25 to 97% by weight acrylic acid and/or methacrylic acid derivatives corresponding to monomer A1, from 3 to 50% by weight oligomeric or polymeric glycol corresponding to monomer A2, from 0 to 25% by weight vinyl compounds corresponding to monomer A3.

In a very advantageous procedure, the monomers chosen for component A are acrylic and/or vinyl monomers which lower the glass transition temperature of the block P(A)—alone or in combination with further monomers for component A—to below 0° C.

As monomers A1 it is preferred to use one or more compounds described by the general formula (I) in which $R^I$=H or $CH_3$ and the radical $R^{II}$ is chosen from the group consisting of aliphatic linear, branched or cyclic, substituted or unsubstituted, saturated or unsaturated alkyl radicals having from 4 to 14, preferably from 4 to 9, carbon atoms.

Preferred examples of monomers A1 are n-butyl acrylate, n-pentyl acrylate, n-hexyl acrylate, n-heptyl acrylate, n-octyl acrylate, n-nonyl acrylate and their branched isomers, such as 2-ethylhexyl acrylate, for example. Furthermore, the methacrylates corresponding to the abovementioned acrylates are among preferred examples of the monomers A1. Compounds which lend themselves outstandingly to use as monomers A1 are, additionally, isobutyl acrylate, isooctyl acrylate, and isobornyl acrylate.

As monomers A2 it is very preferable to use acrylated and/or methacrylated polyethylene and/or polypropylene glycols and/or derivatives thereof. These monomers contain at least two glycol units. Preference is given to using polyethylene glycol acrylate, polyethylene glycol methacrylate, polypropylene glycol acrylate and/or polypropylene glycol methacrylate. Commercially available examples that may be mentioned here, which are very preferred, are the products having the following trade names: Bisomer PPA 6™, Bisomer PPA 5™, Bisomer PEA 6™ (all BP Chemicals AG), for specifications see the following table.

| Trade name | Specification |
|---|---|
| Bisomer PPA 6 | polypropylene glycol (6 mol) acrylate |
| Bisomer PPA 5 | polypropylene glycol (5 mol) acrylate |
| Bisomer PEA 6 | polyethylene glycol (6 mol) acrylate |

As monomers A3 for synthesizing the blocks P(A) it is preferred likewise to use those monomers which lower the glass transition temperature of the block P(A)—including in combination with the monomers A2 and/or A3—to below 0° C. Vinyl compounds in the above sense are all monomers containing a vinylogous double bond capable of polymerization, especially those in which this double bond is activated for polymerization by functional groups. In this sense it is also possible to classify (meth)acrylates within the group of the vinyl monomers.

In one very advantageous embodiment of the invention, at least one of the monomers of component A, especially at least one of the monomers A3, is chosen such that it contains one or more functional groups which can be used for a crosslinking reaction of the block copolymers, especially for a thermal or radiation-chemical crosslinking, and, very particularly, for a crosslinking which is induced and/or assisted by UV radiation or by irradiation with electron beams.

With particular advantage, these can be (meth)acrylic derivatives containing unsaturated alkyl radicals in the radical $R^{VI}$, of the general formula $$CH_2=CH(R^V)(COOR^{VI}) \qquad (III)$$

in which $R^V$=H or $CH_3$. Preferred for $R^{VI}$ are alkyl radicals having from 3 to 14 carbon atoms which contain at least one C—C double bond. For acrylates modified with double bonds, allyl acrylate and acrylated cinnamates are particularly advantageous.

In one advantageous variant of the pressure sensitive adhesive of the invention, it is also possible to use acrylic monomers of the general formula (III) in which the group —OR$^{VI}$ represents another functional group for crosslinking of the adhesive or comprises one or more further and/or different functional groups for crosslinking of the adhesive. Moreover, it is also possible, very advantageously, to use as monomers A3 vinyl compounds having further double bonds which do not react during the (radical) polymerization. Particularly preferred examples are isoprene and butadiene.

Preferred examples of monomers A3 further include vinyl acetate, acrylamides, photoinitiaters functionalized with at least one double bond, tetrahydrofuryl acrylate, hydroxy-functionalized (meth)acrylates, carboxyl-functionalized (meth)acrylates, amine- or amide-functionalized (meth) acrylates, and also vinyl esters, vinyl ethers, vinyl halides, vinylidene halides, vinyl compounds containing aromatic ring systems and heterocyclic systems in α position, especially vinyl acetate, vinylformamide, vinylpyridine, ethyl vinyl ether, vinyl chloride, vinylidene chloride, and acrylonitrile.

As monomers A3 it is also possible to use, with advantage, hydroxyethyl acrylate, hydroxypropyl acrylate, hydroxyethyl methacrylate, hydroxypropyl ethacrylate, acrylic acid, methacrylic acid, allyl alcohol, maleic anhydride, itaconic anhydride, itaconic acid, benzoin acrylate, acrylated benzophenone, acrylamide, and glyceridyl methacrylate.

In another very advantageous embodiment of the inventive pressure sensitive adhesive, functional groups capable of crosslinking are introduced which are capable of a crosslinking reaction under the effect of thermal energy. Greatly preferred in this context are hydroxyl, carboxyl, epoxy, amide, isocyanato or amino groups.

Component B monomer compounds are preferably chosen such that the polymer blocks P(B) are capable of forming a two-phase domain structure with the polymer blocks P(A). Advantageous examples of compounds used as component B are vinylaromatics, methyl methacrylates, cyclohexyl methacrylates, and isobornyl methacrylates. Particularly preferred examples for component B are methyl methacrylate and styrene.

It has been found particularly advantageous for the invention if the block copolymers have an average molecular weight $M_n$, (numerical average) of between 5 000 and 600 000 g/mol, in particular between 80 000 and 450 000 g/mol.

The fraction of the polymer blocks P(B) is preferably between 10 and 60% by weight, in particular between 15 and 40% by weight, of the overall block copolymers.

The invention additionally provides a process for preparing the inventive pressure sensitive adhesive, in which the block copolymer is prepared by a trithiocarbonate-controlled radical polymerization.

For preparing the block copolymers used for the pressure sensitive adhesives of the invention, it is also possible in principle, however, to use any polymerization which proceeds in accordance with a controlled-growth radical mechanism, such as, for example, ATRP (atom-transfer radical polymerization) or nitroxide/TEMPO controlled polymerization or, more preferably, the RAFT process (rapid addition-fragmentation chain transfer).

The polymerization can be conducted in the presence of an organic solvent or in the presence of water, or in mixtures of organic solvents and/or water, or else without solvent. It is preferred to use as little solvent as possible. Depending on conversion and temperature, the polymerization time is between 6 and 72 hours.

In the case of solution polymerization, the solvents used are preferably esters of saturated carboxylic acids (such as ethyl acetate), aliphatic hydrocarbons (such as n-hexane or n-heptane), ketones (such as acetone or methyl ethyl ketone), special boiling point spirit, aromatic solvents such as toluene or xylene, or mixtures of these solvents. For polymerization in aqueous media or in mixtures of organic and aqueous solvents, it is preferred to add emulsifiers and stabilizers for the polymerization. Polymerization initiators used are customary radical-forming compounds such as, for example, peroxides, azo compounds, and peroxosulfates. Initiator mixtures are also outstandingly suitable.

For the purpose of radical stabilization, nitroxides of type (IVa) or (IVb) are used:

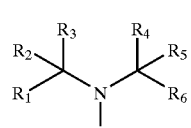

(IVa)

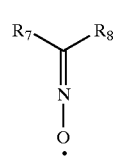

(IVb)

in which $R_1$, $R_2$, $R_3$, $R_4$, $R_5$, $R_6$, $R_7$, and $R_8$ independently of one another denote the following compounds or atoms:
i) halides, such as chlorine, bromine or iodine
ii) linear, branched, cyclic, and heterocyclic hydrocarbons having from 1 to 20 carbon atoms, which can be saturated, unsaturated, and aromatic,
iii) esters —COOR$_9$, alkoxides —OR$_{10}$ and/or phosphonates —PO(OR$_{11}$)$_2$, in which $R_9$, $R_{10}$ and $R_{11}$ are radicals from group ii).

The compounds (IVa) or (IVb) may also be attached to polymer chains of any kind and can therefore be used for constructing the block copolymers, as macroradicals or macroregulators.

As controlled regulators for the polymerization it is more preferred to use compounds of the following types:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl-1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide.

As a further controlled polymerization method, use is made of atom transfer radical polymerization (ATRP), in which preferably monofunctional or difunctional secondary or tertiary halides are used as initiators and the halide(s) is (are) abstracted using complexes of Cu, Ni, Fe, Pd, Pt, Ru, Os, Rh, Co, Ir, Cu, Ag or Au [EP 0 824 111 A1; EP 0 826 698 A1; EP 0 824 110 A1; EP 0 841 346 A1; EP 0 850 957 A1]. The various possibilities of ATRP are described further in the documents U.S. Pat. Nos. 5,945,491 A, 5,854,364 A, and 5,789,487 A.

The block copolymers of the invention can also be prepared by anionic polymerization. In this case the reaction medium used preferably comprises inert solvents, such as aliphatic and cycloaliphatic hydrocarbons, or else aromatic hydrocarbons, for example. The living polymer is generally represented by the structure P(B)-M, in which M is a metal from Group I of the Periodic Table, such as lithium, sodium or potassium, for example. The molecular weight of the polymer is determined by the ratio of initiator to monomer. In order to construct the block structure, the monomers for block P(A) are added, after which the monomer(s) for block P(B) is (are) added in order to prepare the polymer block P(B)-P(A)-P(B). Alternatively, P(B)-P(A)-M can be coupled by a suitable difunctional compound. In this way, star block copolymers $[P(B)-P(A)]_nX$ and also block copolymers P(A)-P(B)-P(A) are also obtainable. Examples of suitable polymerization initiators include n-propyllithium, n-butyllithium, 2-naphthyllithium, cyclohexyllithium and octyllithium, without wishing this enumeration to constitute any unnecessary restriction. Furthermore, it is also possible to use difunctional initiators, such as 1,1,4,4-tetraphenyl-1,4-dilithiobutane or 1,1,4,4-tetraphenyl-1,4-dilithioisobutane. Coinitiators can also be used. Examples of suitable coinitiators include lithium halides, alkali metal alkoxides, and alkylaluminum compounds.

As a very preferred variant, the RAFT process (reversible addition-fragmentation chain transfer) is carried out. The process is described in detail in the documents WO 98/01478 A1 and WO 99/31144 A1. Suitable with particular advantage for preparing block copolymers are trithiocarbonates [Macromolecules 2000, 33, 243–245], in which case, in a first step, monomers for the end blocks B are polymerized and, in a second step, the middle block A is polymerized. Following the polymerization of the end blocks, the reaction can be terminated and reinitiated. It is also possible to carry out polymerization sequentially without interrupting the reaction. In one very advantageous variant, the trithiocarbonate (V) is used for the polymerization:

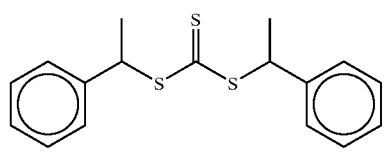

(V)

In the process for preparing the pressure sensitive adhesives of the invention, the solvent is removed under reduced pressure preferably in a concentrative extruder. This is done using, for example, single-screw or twin-screw extruders which distill off the solvent preferentially. Twin-screw extruders may be operated with advantage in corotating or counterrotating mode.

For its advantageous further development, up to 50% by weight, in particular from 20 to 40% by weight, of resins are added to the pressure sensitive adhesive of the invention. Examples of resins used include terpene resins, terpene-phenolic resins, $C_5$ and/or $C_9$ hydrocarbon resins, pinene resins, indene resins and/or rosins, alone or in combination with one another. In principle it is possible to use any resins which are compatible with the corresponding polyacrylate middle block P(A); in particular, mention may be made of all aliphatic, aromatic and alkylaromatic hydrocarbon resins, hydrocarbon resins based on pure monomers, hydrogenated hydrocarbon resins, functional hydrocarbon resins, and natural resins.

In a preferred procedure it is further possible to add additives, particularly crosslinkers, aging inhibitors, light stabilizers, ozone protectants, fatty acids, plasticizers, nucleators, expandants, accelerators and/or fillers (for example, carbon black, $TiO_2$, solid or hollow beads of glass or other materials).

Suitable crosslinkers for chemical crosslinking that are compatible with the pressure sensitive adhesive include, preferably, metal chelates, polyfunctional isocyanates, polyfunctional amines or polyfunctional alcohols. Furthermore, among others it is also possible to use polyfunctional acrylates with advantage as crosslinkers for a crosslinking induced or promoted by actinic radiation.

In the case of UV crosslinking of the pressure sensitive adhesive, UV photoinitiators are added to the block copolymers as substances which promote and/or initiate crosslinking. Useful photoinitiators whose use is very favorable include benzoin ethers, such as benzoin methyl ether and benzoin isopropyl ether, for example, substituted acetophenones, such as 2,2-diethoxy-2-phenyl-1-phenylethanone, 2,2-dimethoxy-2-phenyl-1-phenylethanone, dimethoxyhydroxyacetophenone, for example, substituted alpha-ketols, such as 2-methoxy-2-hydroxy-propiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example.

A further development which makes the inventive process particularly advantageous for the preparation of, for example, adhesive tapes is notable for the further processing of the (blended or unblended) pressure sensitive adhesive from the melt, in which case it is applied in particular to a backing.

Suitable backing materials in this context include those materials which are customary and familiar to the skilled worker, such as, for example, films (polyester, PET, PE, PP, BOPP, PVC), webs, foams, wovens and scrimmed films, and also release paper (glassine, HDPE, LDPE).

Subsequent to preparation and further processing, advantageously, the pressure sensitive adhesive is crosslinked. Crosslinking takes place preferably by means of brief UV exposure within a wavelength range of about 200 to 400 nm using commercially customary high or medium pressure mercury lamps with an output of, for example, from 80 to 240 W/cm, by means of thermal energy within a temperature range between about 70 and 140° C., or by means of ionizing radiation, such as electron beam curing, for example.

For UV crosslinking it may be appropriate to adapt the lamp output to the belt speed or, in the case of slow travel, to partially shade off the belt in order to reduce its heat exposure. The exposure time depends on the model and output of the radiation sources in question.

Accordingly, the invention finally provides for the use of a pressure sensitive adhesive as described above for an adhesive tape provided with the pressure sensitive adhesive, particularly for bonds to apolar surfaces, the acrylic adhesive being applied preferably from the melt as a one-side or both-sides film to a backing.

EXAMPLES

The purpose of the examples below is to illustrate the invention, without wishing to subject it to any unnecessary restriction.

| Commercially available chemicals employed | | |
|---|---|---|
| Substance | Sold by | Chemical composition |
| Vazo 67 | DuPont | 2,2'-azobis(2-ethylpropionitrile) |
| Regalite R91 | Hercules | fully hydrogenated hydrocarbon resin, $M_n$ = 500 g/mol, polydispersity = 1.4 Softening range: 85–91° C. |
| Bisomer PPA 6 | BP Chemicals | polypropylene glycol (6 mol) acrylate |
| Bisomer PEA 6 | BP Chemicals | polyethylene glycol (6 mol) acrylate |

Test Methods
Shear Strength (Test TA)

A strip of adhesive tape 13 mm wide was applied to a smooth, cleaned steel surface. The area of application measured 20 mm×13 mm (length×width). Subsequently, the following procedure was carried out:
At room temperature, a 1 kg weight was fastened to the adhesive tape, and the time until the weight fell off was recorded.
The shear adhesion times recorded are each recorded in minutes and correspond to the average of three measurements.

180° Bond Strength Test (Test TB1 TB2)

A strip 20 mm wide of an acrylic pressure sensitive adhesive applied to a polyester layer was applied in turn to steel (TB1) or PE (TB2) plates. The pressure sensitive adhesive strip was pressed down twice onto the substrate using a 2 kg weight. The adhesive tape was then immediately removed from the substrate at an angle of 180° and a speed of 300 mm/min. All of the measurements were conducted at room temperature under controlled-climate conditions. The results are reported in N/cm and are averaged from three measurements.

Peel Increase (Test TC1, TC2)

A strip 20 mm wide of an acrylic pressure sensitive adhesive applied to a polyester layer was applied in turn to steel (TC1) or PE (TC2) plates. The pressure sensitive adhesive strip was pressed down twice onto the substrate using a 2 kg weight. After 72 hours of bonding, the adhesive tape was removed from the substrate at an angle of 180° and a speed of 300 mm/min. All of the measurements were conducted at room temperature under controlled-climate conditions. The results are reported in N/cm and are averaged from three measurements.

Preparation of the Trithiocarbonate

As a regulator, the following trithiocarbonate (V) was prepared in accordance with Macromolecules 2000, 33, 243–245 and Synth. Commun. 1988,18, 1531–1536.

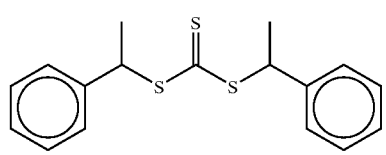
(V)

Polymerization Procedure
Trithiocarbonate-Functionalized Polystyrene (VI):

A 500 ml Schlenk vessel was charged with 400 ml of styrene and 3.47 g of the trithiocarbonate (V) (0.01172 mol) and degassed three times, after which the polymerization was carried out under argon. The reaction was initiated by heating to 120° C., 0.2 g of Vazo67™ (DuPont) was added, and polymerization was carried out with stirring for 48 hours. To isolate the product, the batch was cooled to RT and the polymer was dissolved in 1000 ml of dichloromethane and then precipitated from 7.5 l of methanol with vigorous stirring. The precipitate was filtered off on a frit and then analyzed by GPC ($M_n$=22 400, $M_{w/n}$=1.51).

Trithiocarbonate-Functionalized Polystrene (VII)

A 750 ml Schlenk vessel was charged with 500 ml of styrene and 3.47 g of the trithiocarbonate (V) (0.01172 mol) and degassed three times, after which the polymerization was carried out under argon. It was initiated by heating to 120° C. and carried out with stirring for 48 hours. To isolate the product, the batch was cooled to RT and the polymer was dissolved in 1000 ml of dichloromethane and then precipitated from 7.5 l of methanol with vigorous stirring. The precipitate was filtered off on a frit and then analyzed by GPC ($M_n$=29 100, $M_{w/n}$=1.26).

Example 1

A reactor conventional for radical polymerizations was charged with 32 g of trithiocarbonate-functionalized polystyrene (VI), 400 g of 2-ethylhexyl acrylate, 76 g of Bisomer PPA 6™ (BP Chemicals), 4 g of acrylic acid and 0.12 g of Vazo 67™ (DuPont). After argon had been passed through for 20 minutes and the reactor degassed twice, it was heated to 70° C. with stirring. After 4 hours, dilution was carried out using 200 g of acetone/isopropanol (97:3), reinitiation took place after 5 hours with 0.12 g of Vazo 67™, and after 24 hours the polymerization was terminated.
For isolation, the batch was cooled to RT, the block copolymer was freed from the solvent mixture in a vacuum/drying cabinet and then coated from the melt onto a Saran-primed PET backing, 23 µm thick, at an application rate of 50 g/m² from a slot die. The product was then tested in accordance with methods TA, TB1, TB2, TC1, and TC2.

Example 2

A reactor conventional for radical polymerizations was charged with 32 g of trithiocarbonate-functionalized polystyrene (VI), 440 g of 2-ethylhexyl acrylate, 36 g of Bisomer PPA 6™ (BP Chemicals), 4 g of acrylic acid and 0.12 g of Vazo 67™ (DuPont). After argon had been passed through for 20 minutes and the reactor degassed twice, it was heated to 70° C. with stirring. After 4 hours, dilution was carried out using 200 g of acetone/isopropanol (97:3), reinitiation took place after 5 hours with 0.12 g of Vazo 67™, and after 24 hours the polymerization was terminated.
For isolation, the batch was cooled to RT, the block copolymer was freed from the solvent mixture in a vacuum/drying cabinet and then coated from the melt onto a Saran-primed PET backing, 23 µm thick, at an application rate of 50 g/m² from a slot die. The product was then tested in accordance with methods TA, TB1, TB2, TC1, and TC2.

Example 3

A reactor conventional for radical polymerizations was charged with 32 g of trithiocarbonate-functionalized polystyrene (VI), 360 g of 2-ethylhexyl acrylate, 116 g of Bisomer PPA 6™ (BP Chemicals), 4 g of acrylic acid and 0.12 g of Vazo 67™ (DuPont). After argon had been passed through for 20 minutes and the reactor degassed twice, it was heated to 70° C. with stirring. After 4 hours, dilution was carried out using 200 g of acetone/isopropanol (97:3), reinitiation took place after 5 hours with 0.12 g of Vazo 67™, and after 24 hours the polymerization was terminated. For isolation, the batch was cooled to RT, the block copolymer was freed from the solvent mixture in a vacuum/drying cabinet and then coated from the melt onto a Saran-primed PET backing, 23 μm thick, at an application rate of 50 g/m² from a slot die. The product was then tested in accordance with methods TA, TB1, TB2, TC1, and TC2.

Example 4

A reactor conventional for radical polymerizations was charged with 32 g of trithiocarbonate-functionalized polystyrene (VII), 340 g of n-butyl acrylate, 4 g of acrylic acid, 40 g of Bisomer PPA 6™ (BP Chemicals) and 0.12 g of azoisobutyronitrile (AIBN). After argon had been passed through for 20 minutes and the reactor degassed twice, it was heated to 60° C. with stirring, reinitiation took place after 2 hours with 0.12 g of Vazo 67™ (DuPont), after 6 hours, dilution was carried out using 150 g of acetone/isopropanol (97:3), and after 24 hours the polymerization was terminated. For isolation, the batch was cooled to RT, the block copolymer was freed from the solvent mixture in a vacuum/drying cabinet and then coated from the melt onto a Saran-primed PET backing, 23 μm thick, at an application rate of 50 g/m² from a slot die. The product was then tested in accordance with methods TA, TB1, TB2, TC1, and TC2.

Example 5

A reactor conventional for radical polymerizations was charged with 32 g of trithiocarbonate-functionalized polystyrene (VII), 340 g of n-butyl acrylate, 4 g of acrylic acid, 40 g of Bisomer PEA 6™ (BP Chemicals) and 0.12 g of azoisobutyronitrile (AIBN). After argon had been passed through for 20 minutes and the reactor degassed twice, it was heated to 60° C. with stirring, reinitiation took place after 2 hours with 0.12 g of Vazo 67™ (DuPont), after 6 hours, dilution was carried out using 150 g of acetone/isopropanol (97:3), and after 24 hours the polymerization was terminated. For isolation, the batch was cooled to RT, the block copolymer was freed from the solvent mixture in a vacuum/drying cabinet and then coated from the melt onto a Saran-primed PET backing, 23 μm thick, at an application rate of 50 g/m² from a slot die. The product was then tested in accordance with methods TA, TB1, TB2, TC1, and TC2.

Example 6

The procedure of Example 5 was repeated. After coating, the pressure sensitive adhesive tape was irradiated with 10 kGy with an acceleration voltage of 200 kV using an EBC unit from Crosslinking. The product was then tested in accordance with methods TA, TB1, TB2, TC1, and TC2.

Example 7

A reactor conventional for radical polymerizations was charged with 32 g of trithiocarbonate-functionalized polystyrene (VII), 300 g of n-butyl acrylate, 4 g of acrylic acid, 80 g of Bisomer PPA 6™ (BP Chemicals) and 0.12 g of azoisobutyronitrile (AIBN). After argon had been passed through for 20 minutes and the reactor degassed twice, it was heated to 60° C. with stirring, reinitiation took place after 2 hours with 0.12 g of Vazo 67™ (DuPont), after 6 hours, dilution was carried out using 150 g of acetone/isopropanol (97:3), and after 24 hours the polymerization was terminated. For isolation, the batch was cooled to RT, the block copolymer was applied from solution to a Saran-primed PET backing, 23 μm thick, at an application rate of 50 g/m², and the swatch was dried in a drying oven at 120° C. for 10 minutes. The product was then tested in accordance with methods TA, TB1, TB2, TC1, and TC2.

Example 8

A reactor conventional for radical polymerizations was charged with 1.8 g of the trithiocarbonate (V), 440 g of 2-ethylhexyl acrylate, 36 g of Bisomer PPA 6™ (BP Chemicals), 4 g of acrylic acid and 250 g of acetone, the vessel was degassed three times, and then the polymerization was carried out under argon. For initiation, the reaction mixture was heated to 80° C., 0.2 g of Vazo 67™ (DuPont) was added and, after a reaction period of 4 hours, initiation was repeated with a further 0.2 g of Vazo 67™ (DuPont). The polymerization was terminated with stirring after 48 hours, and the polymer was cooled to room temperature. It was then was freed from solvent in a vacuum drying cabinet, taken up in 200 g of toluene and 75 g of styrene, and then polymerization was initiated again in a conventional reactor. For this purpose the vessel was again degassed three times and filled with argon. For initiation it was heated to 115° C. and 0.1 g of Vazo 67™ (DuPont) was added. After a further 3 hours and 6 hours, reinitiation was carried out with in each case 0.1 g of Vazo 67™ (DuPont). After a reaction time of 48 hours, the polymerization was terminated by cooling to room temperature. The block copolymer formed was applied from solution to a Saran-primed PET backing, 23 μm thick, at an application rate of 50 g/m², and the swatch was dried in a drying oven at 120° C. for 10 minutes. The product was then tested in accordance with methods TA, TB1, TB2, TC1, and TC2.

Results

The table below lists the technological properties of these Examples 1 to 8

TABLE 1

| Example | SAT RT/TA [min] | BS/TB1 [N/cm] | BS/TB2 [N/cm] | BS/TC1 [N/cm] | BS/TC2 [N/cm] | Peel increase steel [%] | Peel increase PE [%] |
|---|---|---|---|---|---|---|---|
| 1 | +10 000 | 3.0 | 0.8 | 3.1 | 0.9 | +3.3 | +12.5 |
| 2 | +10 000 | 3.8 | 0.9 | 4.2 | 1.1 | +10.5 | +22.2 |
| 3 | +10 000 | 2.7 | 0.6 | 2.7 | 0.7 | 0 | +16.7 |
| 4 | +10 000 | 3.6 | 0.9 | 3.8 | 1.0 | +5.6 | +11.1 |
| 5 | +10 000 | 3.5 | 0.8 | 3.7 | 1.0 | +5.7 | +25 |
| 6 | +10 000 | 2.0 | 0.4 | 2.2 | 0.4 | +10 | 0 |
| 7 | +10 000 | 3.2 | 0.6 | 3.3 | 0.6 | +3.1 | 0 |
| 8 | 3480 | 2.5 | 0.5 | 2.9 | 0.6 | +16 | +20 |

SAT: shear adhesion times in min
BS: bond strength in N/cm
B1: immediate to steel
B2: immediate to polyethylene
C1: after 72 h, to steel
C2: after 72 h, to polyethylene
Peel increase: percentage increase after 72 h, based on the "immediate" figure Examples 1 to 3 represent polystyrene block copolymers which were coated from the melt and contain different fractions of Bisomer PPA 6™ as comonomer. As a result of the ethoxylated side chains, all of the adhesives exhibit low peel increase both on steel and on polyethylene. Additionally, as a result of the composition according to the invention, the adhesives have a high shear strength. Examples 4 to 7 are polystyrene block copolymers having a relatively high average molecular weight (numerical average) and likewise contain different fractions of Bisomer PPA 6™ or PEA 6™. Example 6 was additionally crosslinked with 10 kGy of EB, with the result that the bond strength level falls further but the peel increase is not worsened. Example 7 demonstrates that solution-applied block copolymers also have low peel increase as a result of the composition according to the invention. Example 8 is an inverse block copolymer of type P(A)-P(B)-P(A), which likewise exhibits low peel increase.

We claim:

1. A pressure sensitive adhesive based on block copolymers, said block copolymers having at least one unit composed of three successive polymer blocks, comprising alternating blocks P(A) and P(B), wherein
    P(A) represents a copolymer block obtained from a component A which is comprised of at least two monomers A1, A2, the polymer block P(A) having a softening temperature of from −80° C. to 0° C.,
    at least one of the monomers A1 of component A is an acrylic or methacrylic acid derivative of the general formula $$CH_2=CH(R^I)(COOR^{II}) \quad (I)$$

in which $R^I$=H or $CH_3$ and $R^{II}$ is an aliphatic linear, branched or cyclic, substituted or unsubstituted, saturated or unsaturated alkyl radical having from 1 to 20 carbon atoms,
    at least one of the monomers A2 of component A is an acrylated monomer of the general formula $$CH_2=CH(R^{III})(COOR^{IV}) \quad (II)$$

in which $R^{III}$=H or $CH_3$ and $R^{IV}$ is an oligomeric or polymeric glycol with at least two glycol units,
    P(B) represents a homopolymer or copolymer block obtained from a component B which is composed of at least one monomer B1, the polymer block P(B) having a softening temperature of from 20° C. to 175° C., and
    the polymer blocks P(A) are not homogeneously miscible with the polymer blocks P(B).

2. The pressure sensitive adhesive as claimed in claim 1, wherein component A further comprises at least one vinyl compound A3 containing functional groups.

3. The pressure sensitive adhesive as claimed in claim 2, wherein
    component A has the following composition:
        from 25 to 97% by weight acrylic acid derivative, methacrylic acid derivative, or both, as monomer A1,
        from 3 to 50% by weight oligomeric or polymeric glycol as monomer A2,
        up to 25% by weight vinyl compounds as monomer A3.

4. The pressure sensitive adhesive as claimed in claim 1, wherein
    for the monomer A1 the radical $R^{II}$ chosen is an aliphatic linear, branched or cyclic, substituted or unsubstituted, saturated or unsaturated alkyl radical having from 4 to 14 carbon atoms.

5. The pressure sensitive adhesive as claimed in claim 1, wherein
    monomer A2 is selected from the group consisting of, polyethylene glycol acrylates, polyethylene glycol methacrylates, polypropylene glycol acrylates and polypropylene glycol methacrylates.

6. The pressure sensitive adhesive as claimed in claim 1, wherein
    at least one of the monomers of component A contains one or more functional groups capable of crosslinking the block copolymers.

7. The pressure sensitive adhesive as claimed in claim 1, wherein
    at least one of the monomers of component A is an acrylic derivative having at least one double bond which does not react during a free radical polymerization.

8. The pressure sensitive adhesive as claimed in claim 1, wherein
    the polymer blocks P(B) are capable of forming a two-phase domain structure with the copolymer blocks P(A).

9. The pressure sensitive adhesive as claimed in claim 1, wherein
    the block copolymers have a number average molecular weight of between 5,000 and 600,000 g/mol.

10. The pressure sensitive adhesive as claimed in claim 1, wherein the polymer blocks P(B) are between 10 and 60% by weight of the block copolymer.

11. The pressure sensitive adhesive as claimed in claim 1, wherein said adhesive comprises up to 50% by weight of further components selected from the group consisting of resins, crosslinkers, aging inhibitors, light stabilizers, ozone protectants, fatty acids, plasticizers, nucleators, expandants, accelerators and fillers.

12. An adhesive tape comprising the pressure sensitive adhesive of claim 1 on one or both-sides of the tape.

13. A process for preparing the pressure sensitive adhesive of claim 1, which comprises preparing the block copolymer by means of a trithiocarbonate-controlled radical polymerization.

14. The pressure sensitive adhesive of claim 6 wherein crosslinking is a thermal or radiation-chemical crosslinking.

15. The pressure sensitive adhesive of claim 14, wherein said crosslinking is induced, assisted or both by ultraviolet radiation or electron beam radiation.

16. The pressure sensitive adhesive of claim 10 wherein said polymer blocks P(B) are between 15 and 40% by weight of said block copolymer.

17. The pressure sensitive adhesive of claim 11, wherein said further components comprise from 20–40% by weight of said adhesive.

* * * * *